US012480970B1

(12) United States Patent
Gilday et al.

(10) Patent No.: US 12,480,970 B1
(45) Date of Patent: Nov. 25, 2025

(54) PITOT-STATIC TEST ADAPTER

(71) Applicant: NAV-AIDS LTD, Montréal (CA)

(72) Inventors: Jonathan Maxwell Gilday, Hudson (CA); Peter Piotr Figura, Pierrefonds (CA)

(*) Notice: Subject to any disclaimer, the term of this patent is extended or adjusted under 35 U.S.C. 154(b) by 307 days.

(21) Appl. No.: 18/191,045

(22) Filed: Mar. 28, 2023

Related U.S. Application Data

(60) Provisional application No. 63/324,912, filed on Mar. 29, 2022.

(51) Int. Cl.
*G01P 21/02* (2006.01)
*G01P 5/16* (2006.01)
*G01P 5/165* (2006.01)

(52) U.S. Cl.
CPC ............ *G01P 21/025* (2013.01); *G01P 5/165* (2013.01)

(58) Field of Classification Search
CPC ........ G01P 13/025; G01P 5/165; G01P 13/02; G01P 5/14; G01P 5/16; G01P 5/00; G01P 5/02; G01P 5/12; G01P 5/245; G01P 21/025; G01P 5/07; G01P 5/04; G01P 1/02; G01P 1/08; G01P 5/10; G01P 5/06; G01P 5/18; G01P 5/26; G01P 13/045; G01P 5/005; G01P 5/08; G01P 21/00; G01P 3/62; G01P 5/175; G01P 5/24; G01P 15/00; G01P 15/036; G01P 5/006; G01P 5/083; G01P 5/086; G01P 5/241; G01P 7/00; G01P 5/001; B64D 43/02; B64D 15/20; B64D 43/00; B64D 15/12; B64D 1/18; B64D 1/20; B64D 15/16; B64D 15/22; B64D 2033/0286; B64D 33/02; B64D 45/00; B64D 33/08
USPC ...................................................... 73/170.02
See application file for complete search history.

(56) References Cited

U.S. PATENT DOCUMENTS

| | | | |
|---|---|---|---|
| 10,184,953 B2 * | 1/2019 | Wohlford | G01F 1/46 |
| 11,391,754 B1 * | 7/2022 | Gilday | G01P 5/165 |
| 2023/0408720 A1 * | 12/2023 | Dhandhania | B64D 15/20 |

* cited by examiner

*Primary Examiner* — Andre J Allen
(74) *Attorney, Agent, or Firm* — Anglehart et al.

(57) ABSTRACT

An improved version of pitot test adapters to allow a user to clamp a pitot in an adapter, seal a drain inlet, properly couple a ram and static inlets with independent, simple and efficient steps by moving clamping screws and a separate clamper. The possibility to individually move, align, screw, position, clamp, seal and/or adjust the various components allows for a more efficient and an easier mounting of an adapter onto a pitot tube mounting. The apparatus allows to correctly and more efficiently perform the various testing and calibration of a pitot and associated system of an aircraft.

5 Claims, 7 Drawing Sheets

PITOT-STATIC TEST ADAPTER

CROSS-REFERENCES TO OTHER RELATED PATENT APPLICATIONS

This application claims priority from U.S. provisional patent application 63/324,912 filed Mar. 29, 2022, the content of which is hereby incorporated by reference.

TECHNICAL FIELD

This application relates to an adapter for aircraft probes and more specifically to test adapters for aircraft's pitot.

BACKGROUND

Figure 1A:
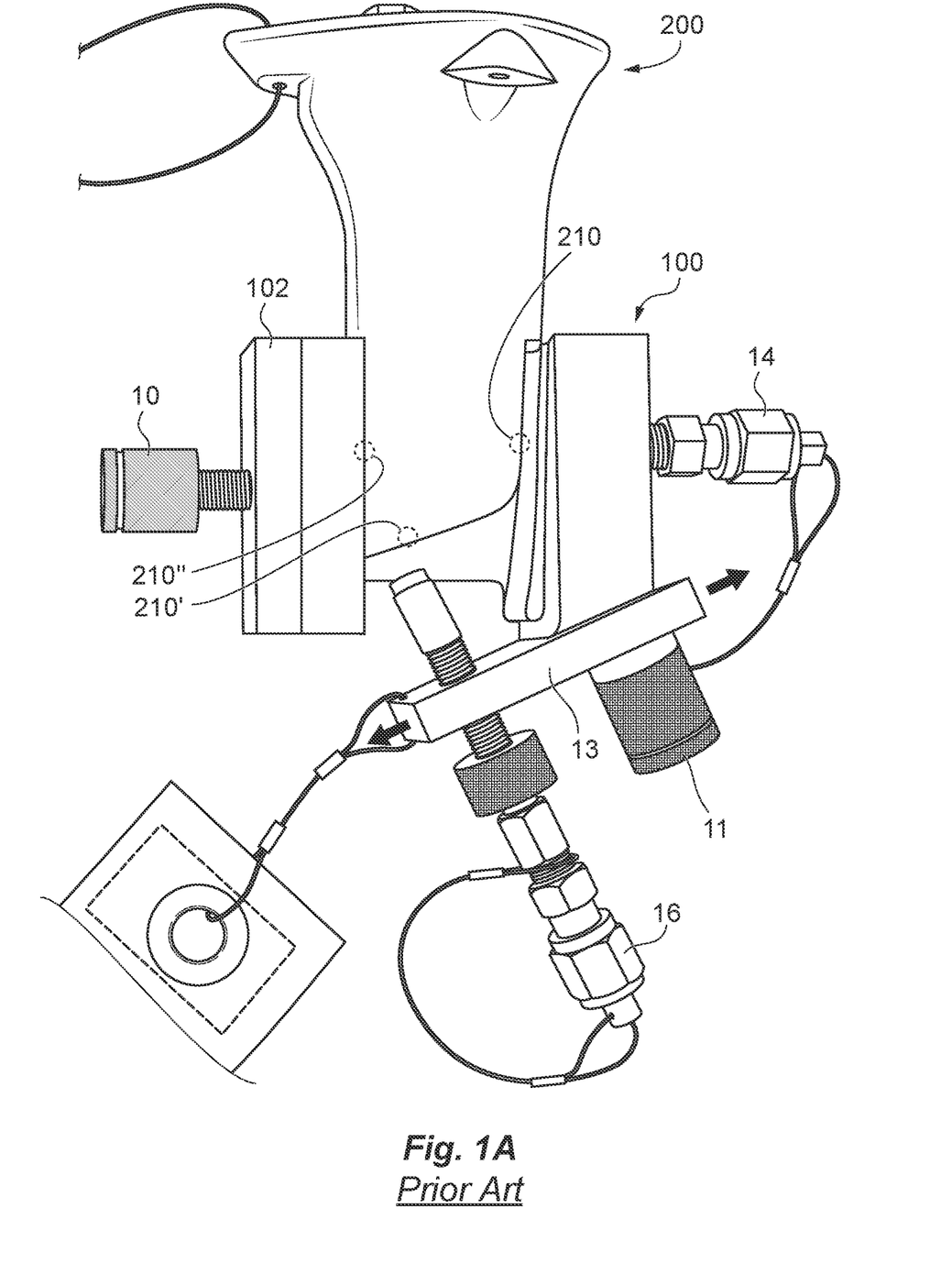
FIG. 1A is a picture of a pitot adapter used by the prior art to test an aircraft's pitot.
Figure 1B:
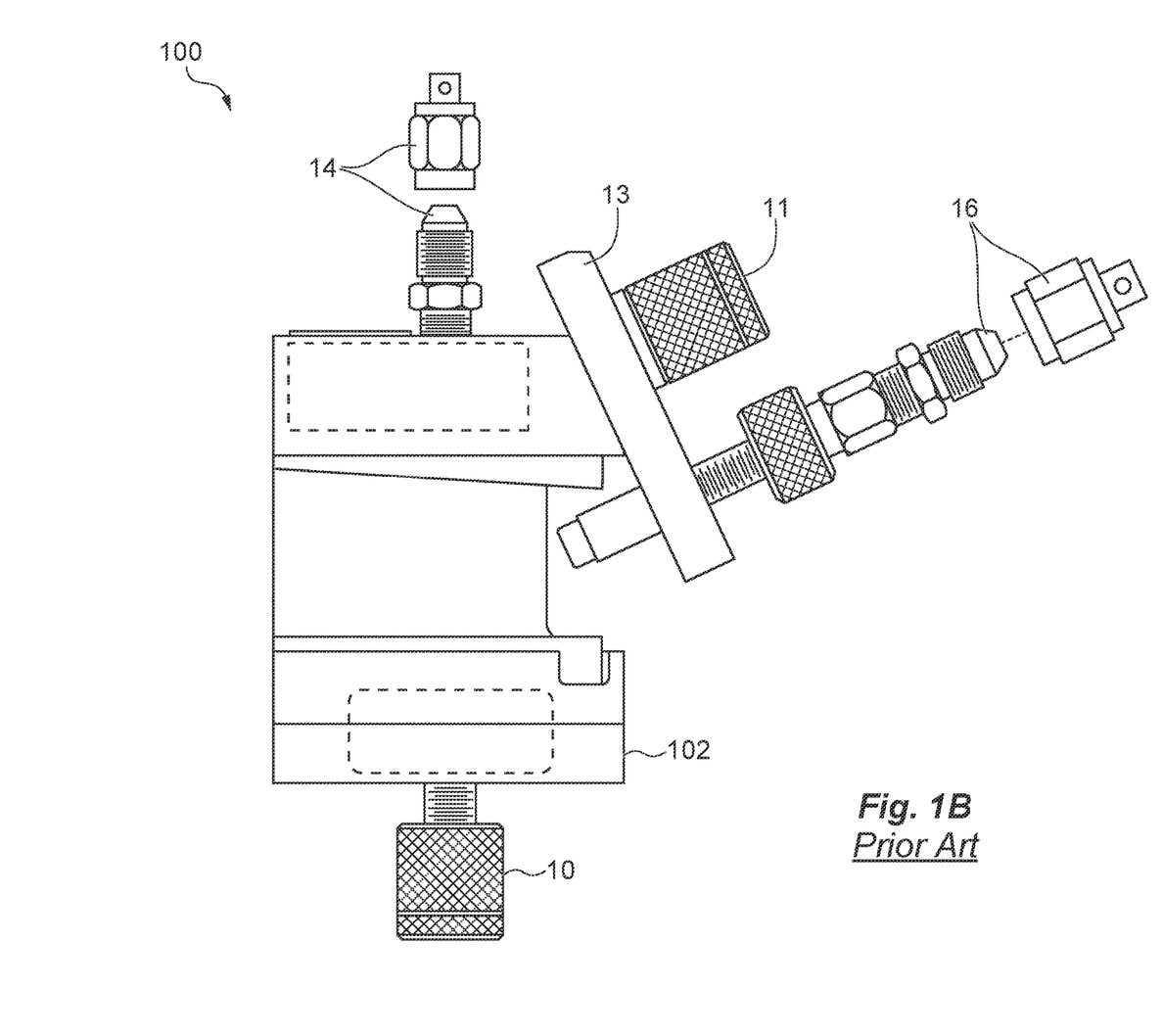
FIG. 1B is a technical drawing of a pitot adapter used by the prior art to test an aircraft's pitot.

Pitot test adapters are already commonly used to test and calibrate pitot probes for various types of aircraft by clamping the adapter to an aircraft's pitot, aligning pressure nozzle(s), coupling or clamping the nozzles to the pitot's inlets, connecting the nozzles to a calibration or testing apparatus used to control the input airflow of the various inlets of the pitot allowing its testing and calibration. However, the apparatuses that are currently used are inefficient when it comes to their installation, difficult to adjust, heavy and awkward to handle. FIG. 1A presents a picture of such a pitot test adapter 100 (see FIG. 1B for its technical drawing) mounted on a pitot vane 200. In this prior art embodiment, the ram inlet nozzle 14 is fixed to the right side of the frame 102. In one hand, the user must there for simultaneously ensure that the ram inlet nozzle 14 remains aligned with the ram inlet 210 of the pitot 200 and ensure that the pitot 200 itself is aligned with the rest of the apparatus, which implies lifting and holding the entire weight of the apparatus, while, on the other hand, screwing the clamping screw 10 to firmly clamp the pitot 200 within the adapter 100. This complex step must result in airtight seals of the drain inlet 210" and the ram inlet 210 (between the inlet entrance and the tip of the ram inlet nozzle 14), while allowing the flow through the ram inlet nozzle 14 and into the ram inlet 210, which often renders the use of the adapter 100 complex and can require multiple attempts to fulfill the mentioned requirements (e.g., none of the inlets is airtight after the first attempt, only one of the inlets is airtight after the second attempt, only the other one of the inlets is airtight after the third attempt, etc.). In this prior art embodiment, the static inlet must be aligned using two different screws; a first static adjusting screw 11 for loosening or tightening a translation arm 13 used to change the side to side position of the static inlet nozzle 16, and a screwable portion of the static inlet nozzle 16 used to push it against the static inlet 210' so as to ensure an airtight seal between them (between the entrance of the inlet and the tip of the nozzle), allowing the flow through the static inlet nozzle 16 and into the static inlet 210'. Furthermore, in this prior art embodiment, the alignment and coupling/clamping of the nozzles (ram inlet nozzle 14 and screwable static inlet nozzle 16) with the various inlets (ram inlet 210 and static inlet 210') of the pitot 200 can only be completed from the front since the current design of the frame 102 does not allow the user to see the region of interest of the pitot from the sides or the back of the pitot test adapter 100.

SUMMARY

The applicant proposes an improved version of the pitot test adapter to allow the user to clamp the pitot in the adapter, seal the drain inlet, properly couple the ram and static inlets with independent, simple and efficient steps by means of moving clamping screws.

BRIEF DESCRIPTION OF THE DRAWINGS

The invention will be better understood by way of the following detailed description of embodiments of the invention with reference to the appended drawings, in which.

DETAILED DESCRIPTION

The following is a detailed description of embodiments of the disclosure depicted in the accompanying drawings. The embodiments are in such detail as to clearly communicate the disclosure without limiting the anticipated variations of the possible embodiments and may encompass all modifications, equivalents, combinations and alternatives falling within the spirit and scope of the present disclosure. It will be appreciated by those skilled in the art that well-known methods, procedures, and components may not have been described in detail in the following so as not to obscure the specific details of the disclosed invention.

As previously explained the pitot test adapters that are currently used (e.g. see the technical drawing of FIG. 1B of an exemplary embodiment of the prior art presented in FIG. 1A and described in the background) are inefficient when it comes to their installation, difficult to adjust, heavy and awkward to handle.

The applicant presents herein an improved version of pitot test adapters to allow a user to clamp a pitot in an adapter, seal a drain inlet, properly couple a ram and static inlets with independent, simple and efficient steps by means of moving clamping screws and a separate clamper. One of the main aspects of the proposed ameliorations to the design of a pitot test adapter is the possibility to individually move, align, screw, position, clamp, seal and/or adjust the various components needed to complete an appropriate mounting of an adapter 100 onto a pitot 200 that can be required in order to correctly perform the various testing and calibration of a pitot and associated system of an aircraft.

It will be appreciated that a pitot test adapter maybe modified adjusted or change in a manner to fit, in accordance with the need of a user to be used with a wide variety of pitot types. In some embodiments, a pitot 200 may be pitot vane, a static pitot, a pitot tube or a wide variety of pitot. In a preferred embodiment presented in the picture of FIG. 2, a pitot test adapter 100 can be used for testing and/or calibrating a pitot vane 200 as seen in the picture.

Figure 4A:
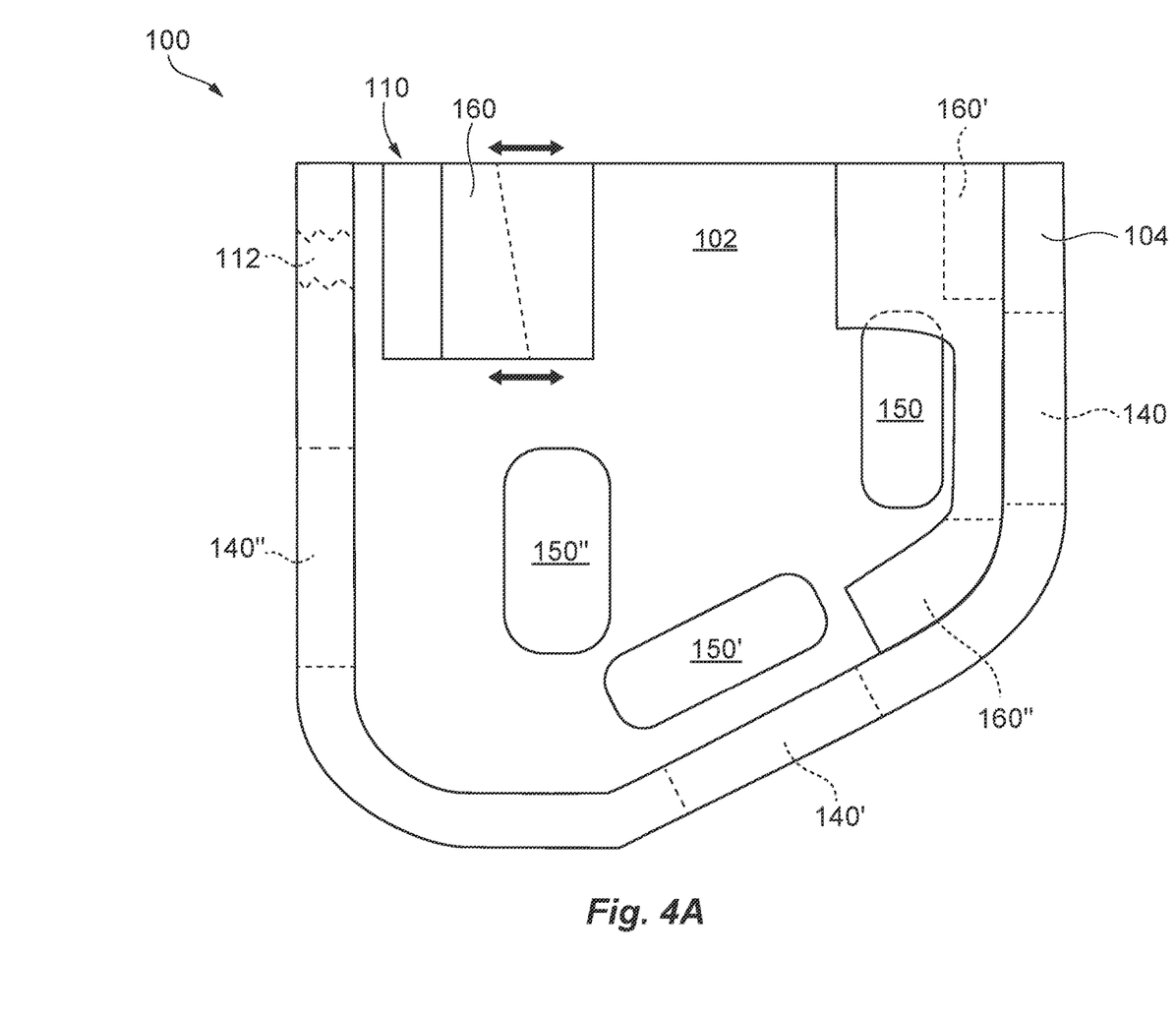
FIG. 4A is schematic drawing of a front view of an embodiment of a proposed pitot test adapter.
Figure 4B:
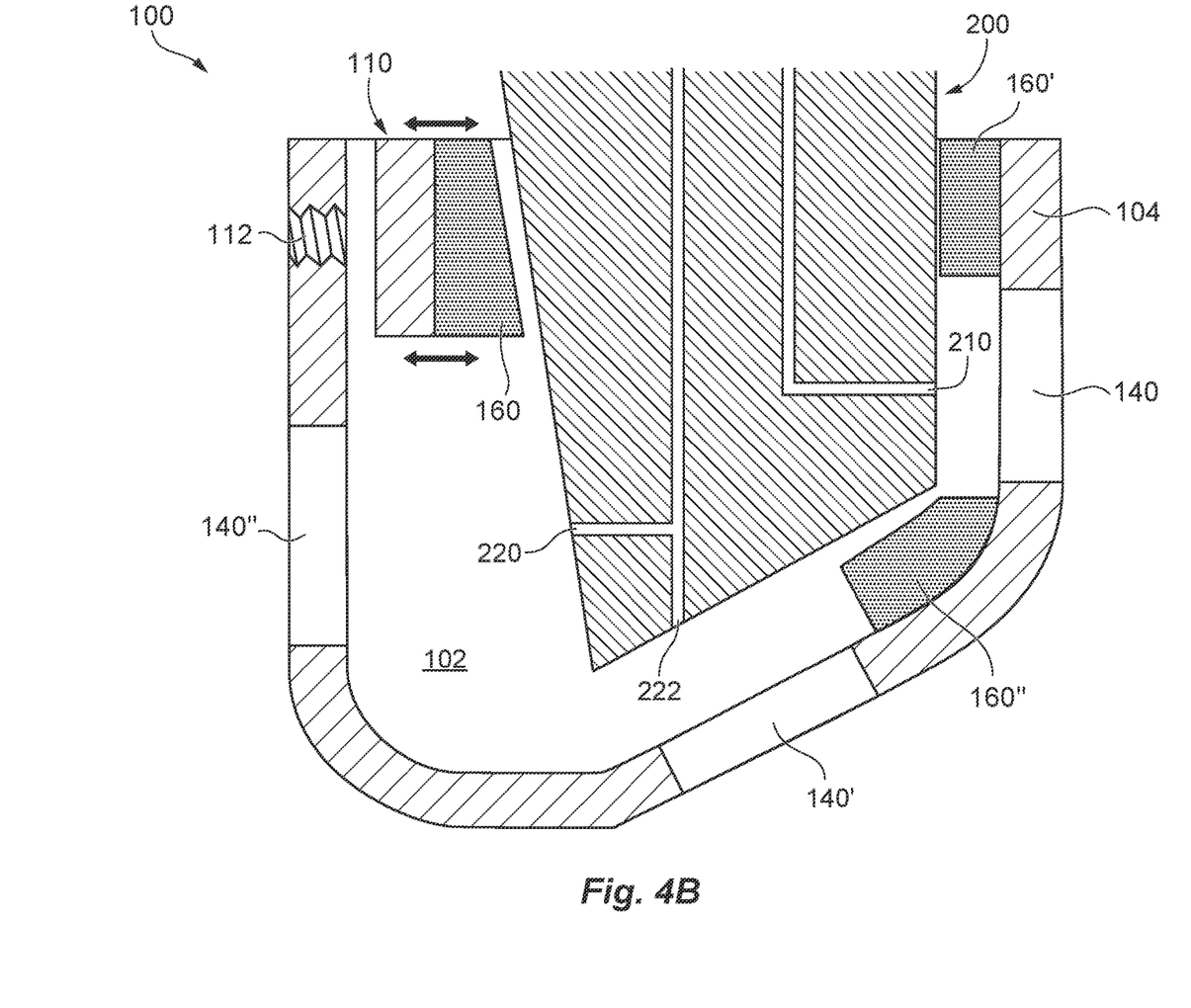
FIG. 4B is schematic drawing of a sectional view, at the half height of a side walls of an adapter's frame, of the embodiment of FIG. 2A.

As best illustrated in FIG. 4B, in an embodiment, a dedicated clamping mechanism that can comprise one or more pitot bracing support(s) 160 (also referred to as clamping support) and a clamper 110 that can move from side to side, which is fixed to a fix clamping screw 10 (a seen in FIG. 2 for example) going through a clamping screw thread 112 in the adapter's frame 102. In the embodiment of FIG. 4B, a user can first position a pitot test adapter 100 onto a pitot 200 in order to rest the pitot on the fixed bracing supports 160' and 160", the user can then use a fix clamping screw 10 (coupled with the clamping screw threads 112) to push a bracing/clamping support 160 of a clamper 110 against a pitot 200 and therefore clamping in place the test adapter 100 onto the pitot 200. The bracing supports 160, 160' and 160" may be made of Delrin®, a semi-crystalline thermoplastic polymer.

In some embodiments, a bracing support can be made of any material that can provide a proper strong clamping without significantly damaging the pitot 200. In some embodiments, the material of a bracing support 160 can be strong enough to support the clamping forces and the weight of the pitot test adapter 100 and some of the components of a testing/calibrating machine. In some embodiments, the material of the bracing support 160 can be resisting to fatigue enough to be used at least several tens of times. In some embodiments, the material of a bracing support 160 can be ductile enough to prevent it cracking when the clamping forces or the weight to support is importantly and to prevent significantly damaging a pitot 200. In some embodiments, a bracing support 160 coupled to the frame 102 and/or side wall 104 of the adapter (e.g., screwed, glued, clipped on, etc.) so to be easily replaced if needed. In an accordance with an embodiment, a bracing support 160 can be made of plastic or polymer of plastic. In a preferred embodiment, a bracing support 160 can be made of polyvinyl chloride (PVC). In some embodiments, a bracing support 160 is coupled to the frame 102 and/or side wall 104 of the adapter any coupling mechanism that can provide adequate coupling (e.g., weld, rivet, molded with the frame, extruded form the frame, etc.).

It will be appreciated that such a distinct clamping mechanism distinguishes itself from prior art and most importantly can allow the user to first insert and firmly clamp the pitot test adapter 100 onto the pitot 200 without requiring the of him to simultaneously, which can save him from having to repeatedly try (almost by trial and error) to align and seal multiple elements. Evidently, once the pitot is clamped in place, the user is then able to focus on aligning and clamping the rest of the various adjustable parts required to properly install the pitot test adapter 100 and allow for the testing and/or calibration of the pitot 200.

Figure 3A:
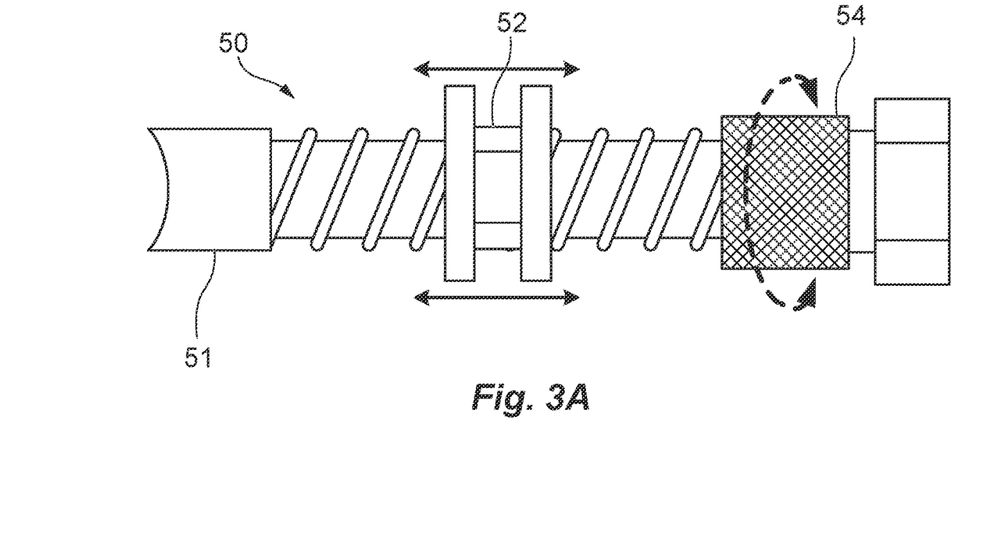
FIG. 3A is schematic drawing of an embodiment of an adjustable clamping seal screw.
Figure 3B:
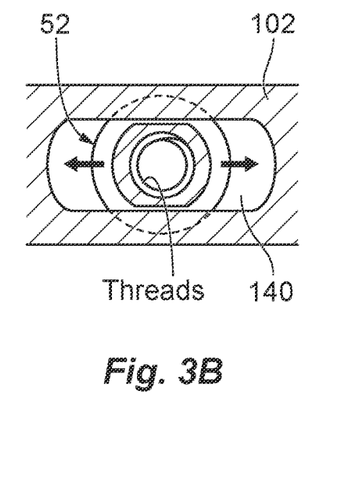
FIG. 3B is schematic drawing of a sectional view of a sliding nut in a positioning slot of an embodiment.

In an embodiment, an adjustable clamping seal screw 50 of FIG. 3A may be used for airtightly seal one of the inlets of the pitot. In accordance with an embodiment, the airtight sealing of a inlet may be accomplished by the pushing/clamping of a sealing tip 51 (corresponding to the screw tip of an adjustable clamping seal screw) of the adjustable clamping seal screw 50 onto one of the pitot's inlet 210, which can result from the screwing (appropriate rotation) of the screw's grip 54 (knurled outside surface) by the user once he has aligned it or while he aligns it with the position of the corresponding inlet. The term adjustable in "adjustable clamping seal screw 50" refers to its capacity of align and change its position along the side wall 104 within the corresponding positioning or sliding slot 140. In accordance with a preferred embodiment, the alignment of the side-to-side position relatively to the inlet of the pitot (i.e., parallel to the side wall 104 of the frame) is enabled with the use of a sliding nut 52 that screwed to the adjustable clamping seal screw 50 to allow it to move up and down the screw as illustrated in FIG. 3A. Such a sliding nut 52 is used to slide in and along a positioning slot 140 of a side wall 102 as illustrated in FIG. 3B, which allows the user to align the tip 51 of the adjustable clamping seal screw 50 on a inlet 210 of the pitot 200. It will be appreciated that the sliding nut 52 can further allow for the clamping of the adjustable clamping seal screw 50 by providing a compressing force on the side wall 102 with one of its edges (larger top and bottom parts of the sliding nut) when compressing the tip 51 onto the pitot 200, therefore providing appropriate airtight sealing of the tip 51 on the inlet 210 and clamping of the adjustable clamping seal screw 50. In a preferred embodiment, an adjustable clamping seal screw 50 having a curved drain hole seal tip 51' can be used to seal a drain inlet 210" of a pitot 200. In some embodiments, the tip 51 of the adjustable clamping seal screw can be made of any material allowing for airtight sealing of the chosen inlet, such materials can include flexible, elastic, viscoelastic, elastomeric and others. In a preferred embodiment, the material of the clamping screw's tip 51 is an elastomeric material such as rubber. In accordance with an embodiment, to provide and ensure an airtight seal, the tip 51 of the adjustable clamping seal screw 50 can be shaped as needed, in accordance with the shape of the entrance of the inlet (e.g., a drain inlet 210") or outer surface and body of the pitot around it.

It will be appreciated by someone skilled in the art that, although an adjustable clamping seal screw may be a significant improvement from the prior art, the clamper of the prior art embodiment of FIG. 1A, that can both clamp the pitot in place and seals the drain inlet 210", could provide an appropriate sealing of the drain inlet 210" in the proposed apparatuses that would still be a novel improvement over the prior art with the use of the following aspect. Evidently, in the embodiments using such a configuration, the clamper 110 may be covered with a layer of one of the materials as previously described for used as a tip 51 of the adjustable clamping seal screw 50.

Figure 3C:
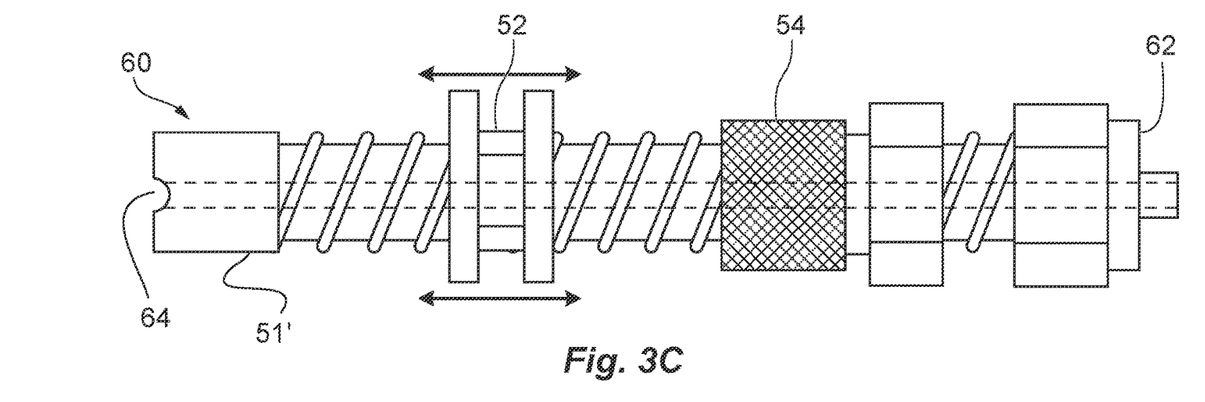
FIG. 3C is schematic drawing of an embodiment of an adjustable clamping nozzle.

In fact one of the main aspects of the proposed improvements, is the may integration of the adjustable clamping seal screw mechanism to a coupling and sealing nozzle used to connect inlets with the testing equipment. In an embodiment, an adjustable clamping nozzle 60 of FIG. 3C may be used for airtightly seal a testing/calibrating machine to the inlet(s) 210 of the pitot 200. In accordance with an embodiment, the airtight sealing of the tip 51' of the adjustable clamping nozzle 60 around an inlet to allow air to flow through the internal pipe 64 into one of the pitot's 210 inlet may be accomplished by the pushing of the tip 51' onto the inlet. As previously explained the term adjustable in "adjustable clamping nozzle 60" refers to its capacity to align and change its position with the use of a sliding nut 52 that allows the user to align the tip 51' of the nozzle 60 on a inlet 210, to airtight seal it around the inlet and to clamp the nozzle in place. In a preferred embodiment, an adjustable clamping nozzle 60 can be used to seal a ram inlet 210 and/or a static inlet 210' of a pitot 200. In some embodiments, a tip 51' can also be made of any material allowing for airtight sealing of the chosen inlet, such materials can include flexible, elastic, viscoelastic, elastomeric and others. In a preferred embodiment, the material of a tip 51' is an elastomeric material such as rubber. In accordance with an embodiment, to provide and ensure an airtight seal, a tip 51' of an adjustable clamping nozzle 60 can be shaped as needed, in accordance with the shape of the entrance of a inlet (e.g., ram or static inlet 210 and 210') or outer surface and body of a pitot around it. An adjustable clamping nozzle 60 can have a connection mechanism 62 at the other end (opposed from the tip 51') that can allow to connect the testing/calibrating machine (e.g., air pipe or pressure hose).

As illustrated in FIG. 4A, in some embodiments, the frame 102 of a pitot test adapter 100 can have one or more adjustment opening 150 that can allow the user to see a tip (51 or 51') from the back of the adapter 100. It will be appreciated that an adjustment opening 150 is an improvement over the prior art and can be used by the user to complete an installation of the pitot test adapter 100 onto a pitot 200 without being limited to aligning it from the front of it and allows him to adjust it from the back of it. In a preferred embodiment, the frame 102 can have an adjustment opening 150 for each of the adjustable clamping seal screw(s) 50 and adjustable clamping nozzle(s) 60.

In some embodiments, a side wall 104 of a frame 102 can have one or more positioning/sliding slot 140. In some embodiments, the portions of the side wall 104 can be arranged to be almost parallel (e.g., +/−10 degrees or +/−5 degrees) to a corresponding portion (e.g., the surface of the housing of the pitot tube facing this portion of the side wall 104) of a side of the vane-type pitot tube having/comprising at least one port of the pitot tube (e.g., a static port, a drain port and/or a pitot port). It will be appreciated that this can ensure an optimal fit and seal between a seal tip 51 and the surface (around the port) of the corresponding portion of the pitot tube, since this can allow and can ensure that the adjustable clamping nozzle 60 or adjustable clamping seal screw 50 is pushed perpendicularly to this surface when screwed into place. In a preferred embodiment, the portions of the side wall 104 can be arranged to be parallel to the corresponding portion of a side of the vane-type pitot tube having/comprising at least one port of the pitot tube. In accordance with an embodiment, an adjustment opening 150 is dimensioned so that a tip (51 or 51') can clearly be seen from the back independently of the position of the tip (from one extremity of the positioning slot 140 to the other). In some embodiments, the frame 102 and side wall(s) 104 are parts of a single extruded or molded part. In some embodiments, the frame 102 and/or side wall(s) 104 can be made of any material that can provide a strong frame and support to perform proper clamping(s). In some embodiments, the frame 102 and/or side wall(s) 104 can be made of metal (e.g., aluminum, iron, steel, or any other metal or metal alloy).

Figure 2:
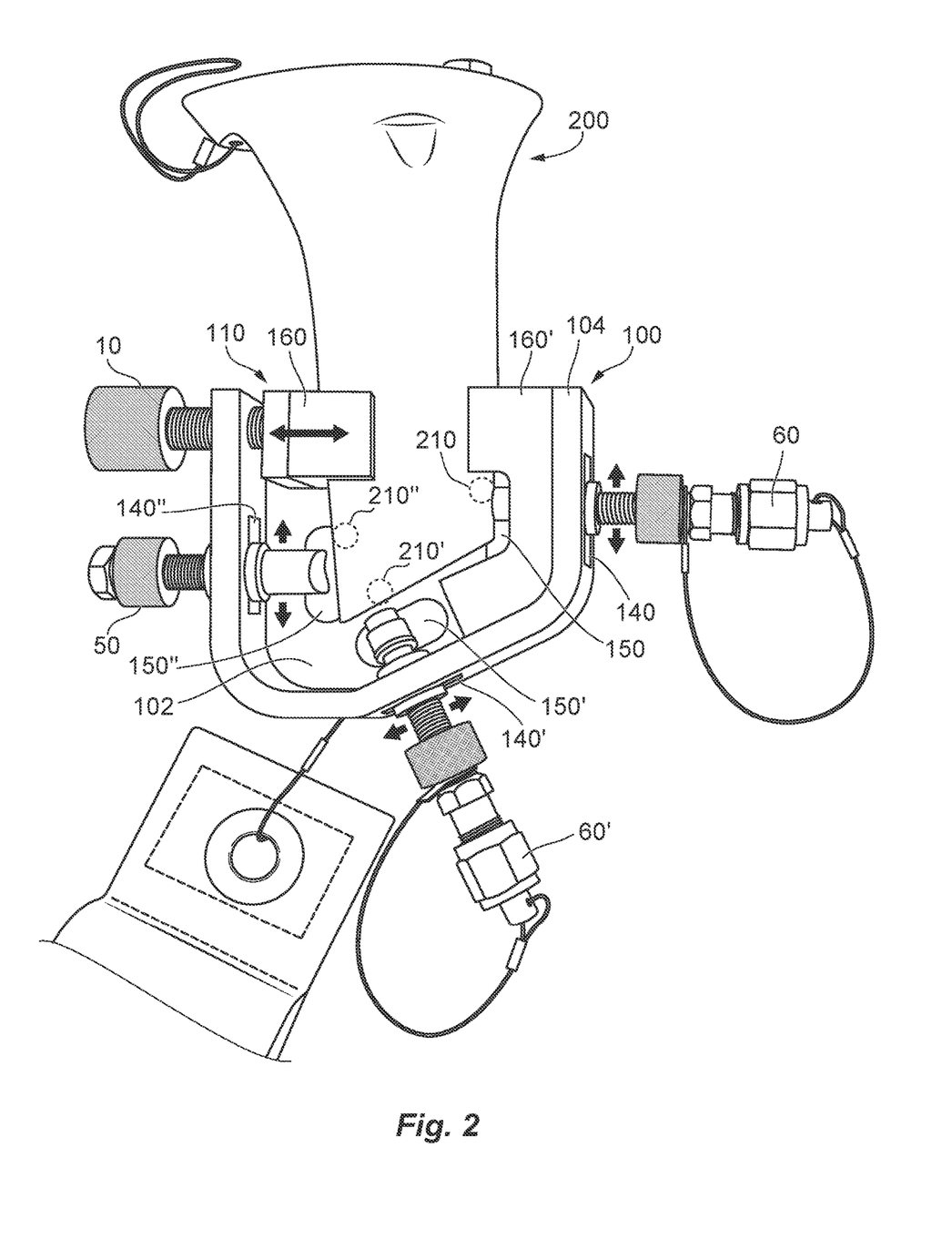
FIG. 2 is a picture of a pitot adapter used by the prior art to test an aircraft's pitot.
Figure 5:
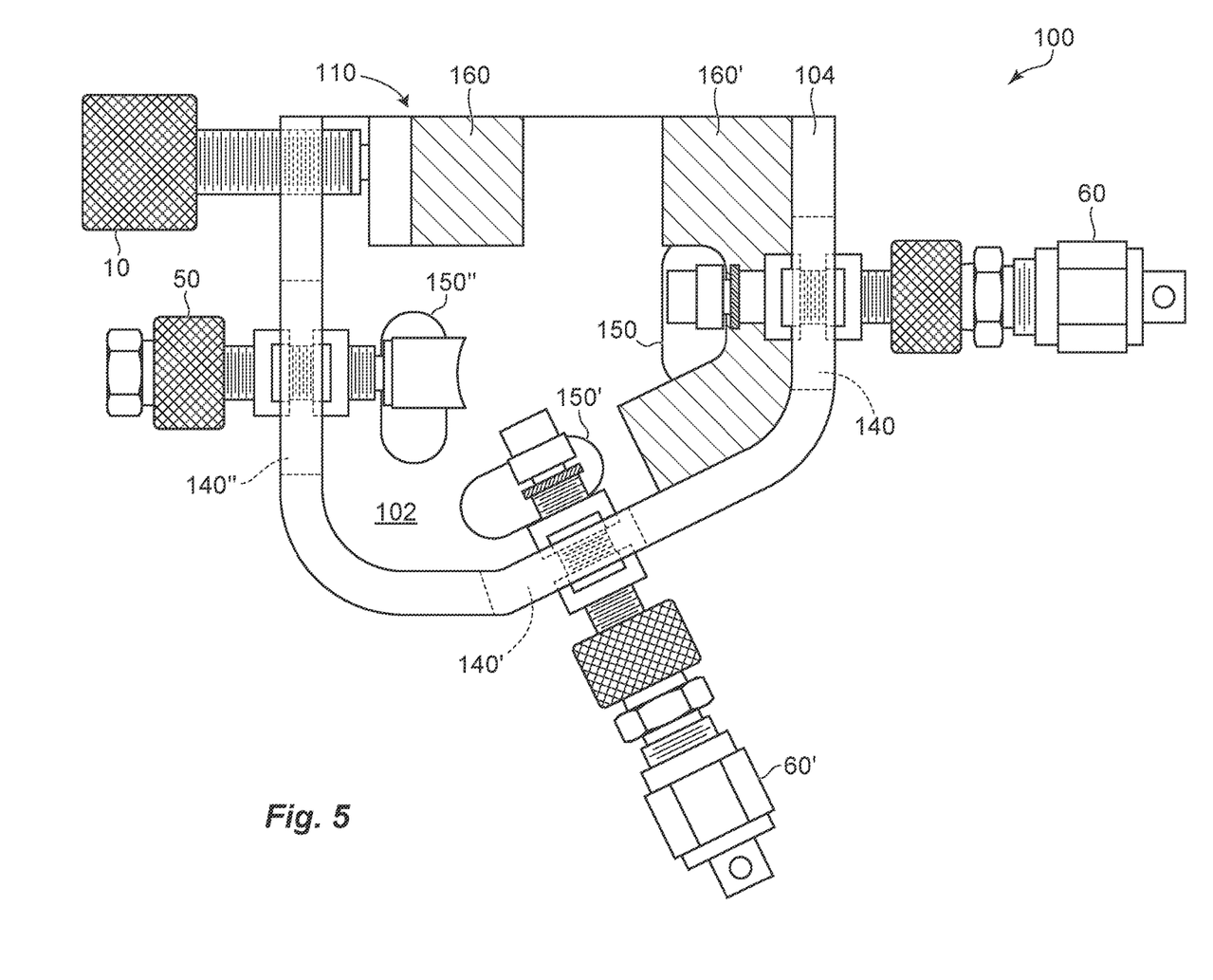
FIG. 5 is a technical drawing of the front view of an embodiment of a proposed pitot test adapter.

FIG. 5 is a technical drawing of the front view of an embodiment of a proposed pitot test adapter 100 comprising some of the elements previously presented in FIGS. 2, 4A and 4B with a coupled adjustable clamping seal screw 50 and coupled to the adjustable clamping nozzles 60 and 60'.

What is claimed is:

1. An adapter device for connecting testing equipment to a vane-type pitot-static tube having at least a static port and a pitot port, the adapter device comprising:
   a frame having a sidewall;
   a clamp arranged on the frame for clamping the frame to the vane-type pitot tube;
   said sidewall of the frame having slots arranged to be between +/−10 degrees from being parallel to corresponding portions of a side of the vane-type pitot tube having said at least said static port and said pitot port;
   at least two nozzles having a sealing tip and an internal conduit for providing an airflow from said testing equipment to said static port and said pitot port;
   at least two fasteners each movable within one of said slots for connecting said at least two nozzles to said static port and said pitot port.

2. The adapter device as defined in claim 1, wherein said vane-type pitot-static tub further comprises a drain port, said sidewall has a further slot, further comprising a drain hole seal member and further fastener movable in said further slot for connecting said drain hole seal member to said drain port.

3. The adapter device as defined in claim 2, wherein said fasteners comprise a sliding nut and a threaded side surface of said at least two nozzles and said drain hole seal member.

4. The adapter device as defined in claim 1, wherein said clamp comprises a clamping screw.

5. The adapter device as defined in claim 1, wherein said sidewall of the frame having slots arranged to parallel to said corresponding portions of said side of said vane-type pitot tube having said at least said static port and said pitot port.

* * * * *